US009625329B2

(12) United States Patent
Gurin et al.

(10) Patent No.: US 9,625,329 B2
(45) Date of Patent: Apr. 18, 2017

(54) MEMS SENSOR OFFSET COMPENSATION WITH STRAIN GAUGE

(71) Applicant: InvenSense, Inc., San Jose, CA (US)

(72) Inventors: Ilya Gurin, Mountain View, CA (US); Joe Seeger, Menlo Park, CA (US)

(73) Assignee: INVENSENSE, INC., San Jose, CA (US)

( * ) Notice: Subject to any disclaimer, the term of this patent is extended or adjusted under 35 U.S.C. 154(b) by 128 days.

(21) Appl. No.: 14/635,205

(22) Filed: Mar. 2, 2015

(65) Prior Publication Data

US 2016/0258825 A1 Sep. 8, 2016

(51) Int. Cl.
| | |
|---|---|
| *G01L 1/18* | (2006.01) |
| *G01D 18/00* | (2006.01) |
| *G01L 27/00* | (2006.01) |
| *G01L 1/22* | (2006.01) |

(52) U.S. Cl.
CPC ............... *G01L 1/18* (2013.01); *G01D 18/00* (2013.01); *G01L 1/183* (2013.01); *G01L 1/2293* (2013.01); *G01L 27/002* (2013.01)

(58) Field of Classification Search
CPC . B81B 2207/015; B81B 7/0045; B81B 7/008; B81B 2201/0235; B81B 2201/0242; B81B 2207/012; G01P 15/125; G01P 15/0802; G01P 15/0888; H01L 24/03; H01L 2924/1461
See application file for complete search history.

(56) References Cited

U.S. PATENT DOCUMENTS

| | | | | |
|---|---|---|---|---|
| 4,430,895 | A * | 2/1984 | Colton | |
| 5,314,572 | A * | 5/1994 | Core | B81C 1/0092 216/17 |
| 7,934,423 | B2 * | 5/2011 | Nasiri | G01P 15/0802 73/514.02 |
| 8,179,121 | B2 * | 5/2012 | Hynd | G01P 15/0802 324/123 R |
| 8,860,437 | B2 * | 10/2014 | Santana | G01D 5/24 324/658 |
| 9,146,252 | B2 * | 9/2015 | Robert | G01P 15/0802 |
| 2011/0174074 | A1 * | 7/2011 | Li | G01C 19/5755 73/504.14 |

(Continued)

*Primary Examiner* — David A Rogers
(74) *Attorney, Agent, or Firm* — McAndrews, Held & Malloy, Ltd.

(57) ABSTRACT

An example system comprises a microelectromechanical system (MEMS) sensor, a strain gauge, and a strain compensation circuit. The MEMS sensor is operable to generate a sensor output signal that corresponds to a sensed condition (e.g., acceleration, orientation, and/or pressure). The strain gauge is operable to generate a strain measurement signal indicative of a strain on the MEMS sensor. The strain compensation circuit is operable to modify the sensor output signal to compensate for the strain based on the strain measurement signal. The strain compensation circuit stores sensor-strain relationship data indicative of a relationship between the sensor output signal and the strain measurement signal. The strain compensation circuit is operable to use the sensor-strain relationship data for the modifying of the sensor output signal. The modification of the sensor output signal comprises one or both of: removal of an offset from the sensor signal, and application of a gain to the sensor signal.

28 Claims, 8 Drawing Sheets

(56) References Cited

U.S. PATENT DOCUMENTS

| | | | |
|---|---|---|---|
| 2013/0043547 A1* | 2/2013 | Chu | H01L 24/81 257/415 |
| 2013/0319117 A1* | 12/2013 | McNeil | G01P 15/125 73/514.32 |
| 2014/0253219 A1* | 9/2014 | Caffee | H02N 1/006 327/516 |
| 2014/0306623 A1* | 10/2014 | Caffee | H02N 1/006 318/116 |

* cited by examiner

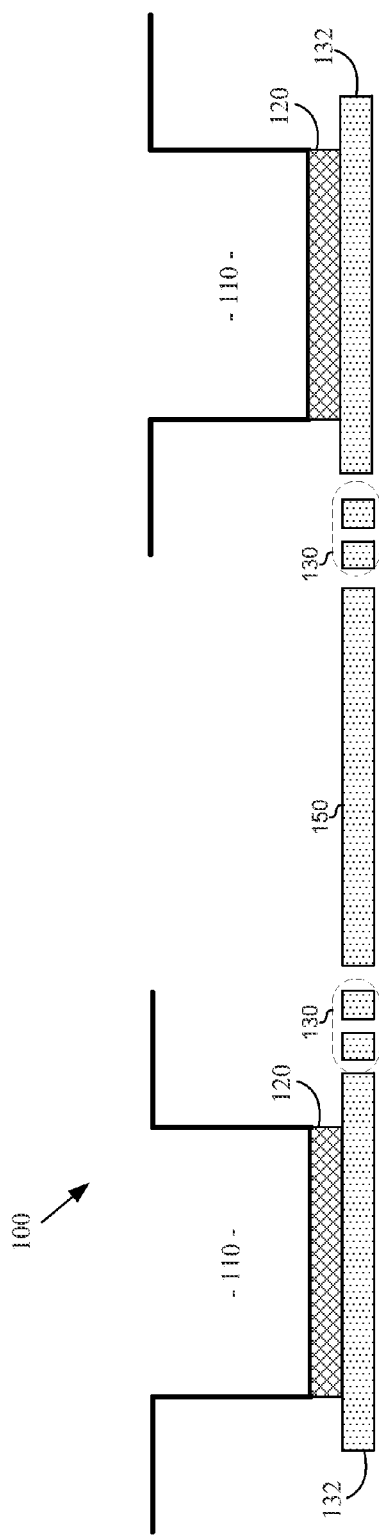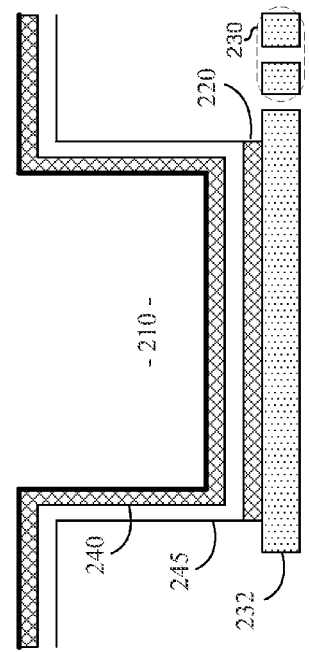

MEMS SENSOR OFFSET COMPENSATION WITH STRAIN GAUGE

BACKGROUND

Stressing a sensor, for example a microelectromechanical system (MEMS) sensor, may cause the performance of the sensor to change, for example through strain (or deformation). Such stress may, for example, include mechanical stress, thermal stress, etc. Limitations and disadvantages of conventional methods and systems for handling the effects of stress on a sensor will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 1 shows an example MEMS sensor cross-section.

FIG. 2 shows an example MEMS sensor architecture comprising a piezoresistive layer, in accordance with various aspects of the present disclosure.

SUMMARY

Figure 3:
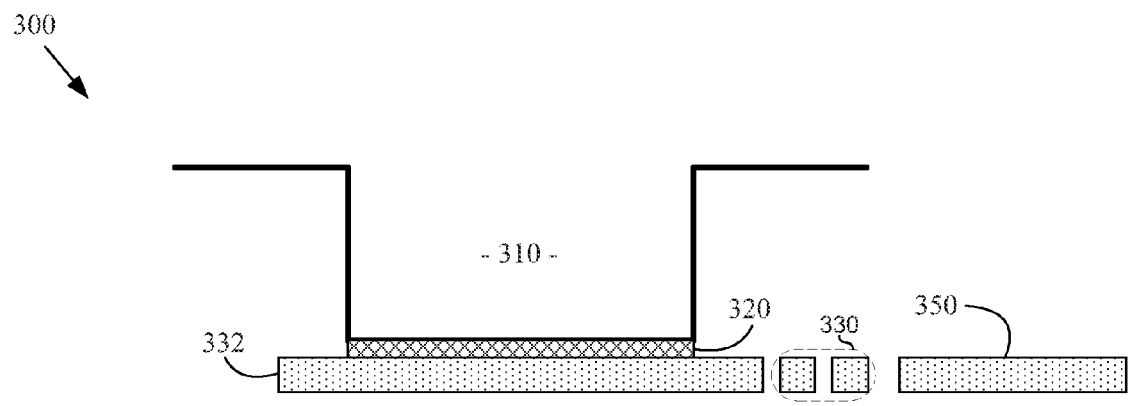
FIG. 3 shows an example MEMS sensor architecture comprising a strain gauge in a MEMS layer, in accordance with various aspects of the present disclosure.

Various aspects of this disclosure provide systems and methods for calibrating and compensating a sensor, for example a MEMS sensor, in real time based on detected sensor stress/strain. As a non-limiting example, a stress/strain gauge positioned on or near a sensor may be utilized to detect a present stress/strain on the sensor. A sensor offset and/or other correction may be estimated based, at least in part, on the detected stress/strain. The estimated sensor offset and/or other correction may be removed from the sensor output.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or x" means "one or more of x, y, and z." As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.). In this disclosure, stress and strain are referred to jointly as "stress/strain" reflecting the fact that one can be used to determine the other (assuming the stress-strain curve is known for the stressed/strained material).

Stress/strain in the die on which a sensor is mounted or integrated causes the performance of the sensor to change. Strain may be manifested as, for example, changes in gap distances (e.g., by bending plates into and/or away from a gap being measured, by moving plates tangentially to a gap, etc.), changes in sensor stiffness (e.g., by adding or reducing tension, by changing curvature of a moving member, etc.), and/or the like.

The impact of stress/strain on sensor performance may be analyzed to determine a known relationship between stress/strain and performance. For example, stress/strain-testing may be performed to determine the relationship between a particular amount of stress/strain on a sensor and a particular amount of gain and/or offset error in said sensor signal resulting from the stress/strain. Once this relationship between stress/strain and sensor performance is known, stress/strain may be measured in the field and used to modify the sensor signal in real time (e.g., to compensate for stress/strain).

FIG. 1 shows an example MEMS sensor cross section. The sensor comprises a MEMS handle layer 110 (or substrate), a MEMS anchor 132, and a MEMS actuator 130. The MEMS handle layer 110 may comprise, for example, a silicon handle. One or more dielectric layers 120 may, for example, be positioned between the handle layer 110 and the MEMS anchor 132. The MEMS actuator 130 may comprise any of a variety of types MEMS actuators, non-limiting examples of which are discussed herein. For example and without limitation, the MEMS actuator 130 may comprise an accelerometer, a magnetometer, a pressure sensor, an audio sensor, a gyroscope, etc.

Any of a variety of different types of stress/strain gauges may be utilized to determine stress/strain on a MEMS sensor, non-limiting examples of which will be discussed herein. For example, a resistive type of stress/strain gauge may be utilized, which determines stress/strain based generally on change in length and/or cross-sectional area of a sensor material (e.g., a conductive material). Also for example, a piezoresistive type of stress/strain gauge may be utilized (e.g., comprising a layer of piezoresistive material like a semiconductor or metal, comprising a doped region in an IC, etc.). Additionally for example, a stress/strain-sensitive MEMS resonator may be utilized. Accordingly, the scope of various aspects of this disclosure should not be limited by characteristics of any particular type of stress/strain gauge.

A stress/strain gauge may, for example, be positioned in any of a variety of locations, non-limiting examples of which will be presented herein. For example, a stress/strain gauge 150 may be formed in MEMS material and positioned laterally (e.g., horizontally) adjacent to the MEMS sensor. Also for example, a stress/strain gauge may be formed and positioned in MEMS material vertically adjacent to the MEMS sensor (e.g., in a MEMS layer different from the MEMS layer in which the MEMS sensor is formed). A stress/strain gauge may, for example, be positioned vertically adjacent to the MEMS sensor in a base substrate or layer (e.g., an IC layer) to which the MEMS sensor is coupled. Also for example, a stress/strain gauge may, for example, be positioned both laterally and vertically offset from the MEMS sensor, yet proximately to the sensor. In another example, a resistive and/or piezoresistive stress/strain gauge may be positioned in a metal interconnect layer between a MEMS layer and a base substrate (e.g., an IC layer). One or more stress/strain gauges located at any combination or all of such positions may be utilized. Accordingly, the scope of various aspects of this disclosure should not be limited by characteristics of any particular stress/strain gauge location.

Though the discussion herein may focus on use of a stress/strain gauge, it should be noted that other mechanisms may also be utilized for determining stress/strain being experienced by a sensor. For example, performance of other nearby sensors may be analyzed to ascertain the extent of stress/strain being experienced by the MEMS sensor of interest. Accordingly, unless explicitly stated, the scope of various aspects of this disclosure should not be limited to the use of stress/strain gauges.

Also, though the discussion herein may focus on use of a single stress/strain gauge, it should be noted that a plurality of stress/strain gauges may also be utilized. For example, a plurality of stress/strain gauges may be utilized to determine stress/strain being experienced in a single direction (e.g., disposed on multiple respective sides of a sensor). Also for example, a plurality of stress/strain gauges may be utilized to determine stress/strain being experienced in multiple respective directions (e.g., an x-direction, a y-direction, a z-direction, and/or a torsional stress/strain, etc.). In an example implementation, a plurality of stress/strain gauges (e.g., 2, 3, 4, or more) may be positioned at locations surrounding the MEMS sensor (e.g., laterally surrounding and/or vertically surrounding).

The following discussion will now present various non-limiting examples and various architectures and/or methods.

Turning now to FIG. 2, such figure shows an example MEMS sensor architecture 200 comprising a piezoresistive layer, in accordance with various aspects of the present disclosure. The example sensor 200 may, for example, share any or all characteristics with other example sensors discussed herein.

Shown are a MEMS handle layer 210 (or substrate), a dielectric layer 220, a dielectric layer 240, a piezoresistive layer 245, a MEMS anchor 232, and a MEMS actuator 230. The MEMS handle layer 210, for example a silicon handle, may be coupled to the MEMS anchor 232. One or more dielectric layers 220 may, for example, be positioned between the handle layer 210 and the anchor 232. The dielectric layer 240 may be formed on the handle layer 210, and the piezoresistive layer 245 may be formed on the dielectric layer 240. The dielectric layer 220 may, for example, be formed between the MEMS anchor 232 and the piezoresistive layer 245. Though the piezoresistive layer 245 is shown extending along the entire surface of the handle layer 210, it should be noted that the piezoresistive layer 245 may be formed at any of a variety of locations, for example just between the dielectric layer 220 and the MEMS handle layer 210, just at anchor points, etc. The change in resistance and/or resistivity of the piezoresistive layer 245 may, for example, be monitored as an indication of stress/strain that the sensor 200 is experiencing.

In another implementation, though not shown, a piezoresistive layer 245 may also be formed on the base substrate (e.g., an IC layer), for example on or between dielectric layers. As with the piezoresistive layer 245, such a layer may be formed along the entire base substrate and/or a portion thereof.

As mentioned herein, a stress/strain gauge may be positioned laterally adjacent to the MEMS sensor, for example in the same MEMS layer in which the MEMS sensor is formed and/or in a different MEMS layer. FIG. 3 provides a non-limiting example of such an architecture.

Turning now to FIG. 3, shown is an example MEMS sensor architecture 300 comprising a stress/strain gauge in a MEMS layer, in accordance with various aspects of the present disclosure. The example sensor 300 may, for example, share any or all characteristics with other example sensors discussed herein.

As discussed herein, a stress/strain gauge (e.g., a MEMS stress/strain gauge) may be formed in MEMS and positioned laterally (e.g., horizontally) to the sensor. The example sensor 300, comprises a stress/strain gauge 350 (e.g., a MEMS resistive and/or piezoresistive stress/strain gauge, a stress/strain-sensitive MEMS resonator, etc.) formed in the same layer as the MEMS actuator 330. Note that although not shown in FIG. 3, there may also be a vertical distance between the actuator 330 and the stress/strain gauge 350.

Figure 4:
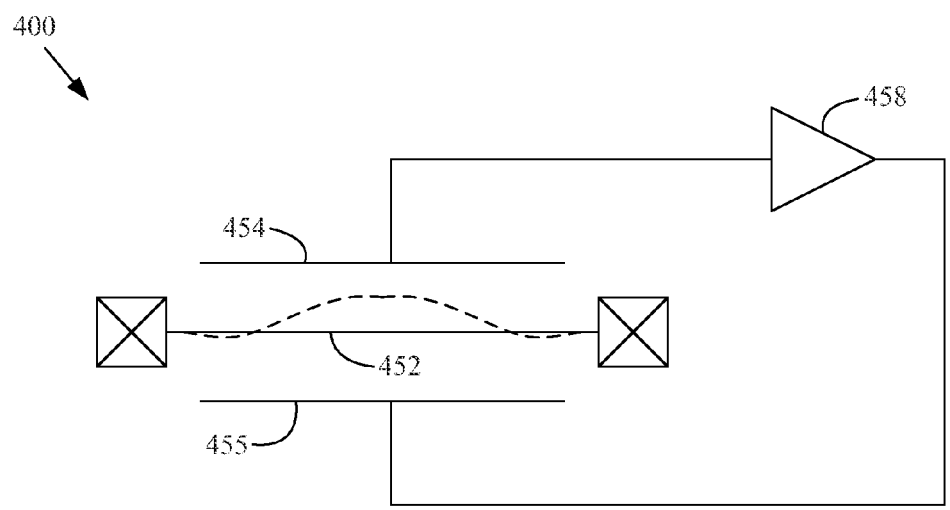
FIG. 4 shows an example resonator strain gauge, in accordance with various aspects of the present disclosure.

Also as discussed herein, the stress/strain gauge 350 may comprise characteristics of any of a variety of different types of stress/strain sensors. The stress/strain gauge 350 may, for example, comprise a stress/strain-sensitive MEMS resonator. An example of such a resonator-type stress/strain gauge is illustrated at FIG. 4. Turning now to FIG. 4, such figure shows an example resonator stress/strain gauge 400, in accordance with various aspects of the present disclosure.

The example stress/strain gauge 400 comprises a resonating member 452, such as a beam or diaphragm, excitation plates 454 and 455, and a sustaining amplifier 458. The resonating characteristics (e.g., frequency, etc.) of the resonating member 452 indicate stress/strain experienced by the resonating member 452 (e.g., tension resulting in expansion) and may be monitored to determine the amount of stress/strain.

Figure 5:
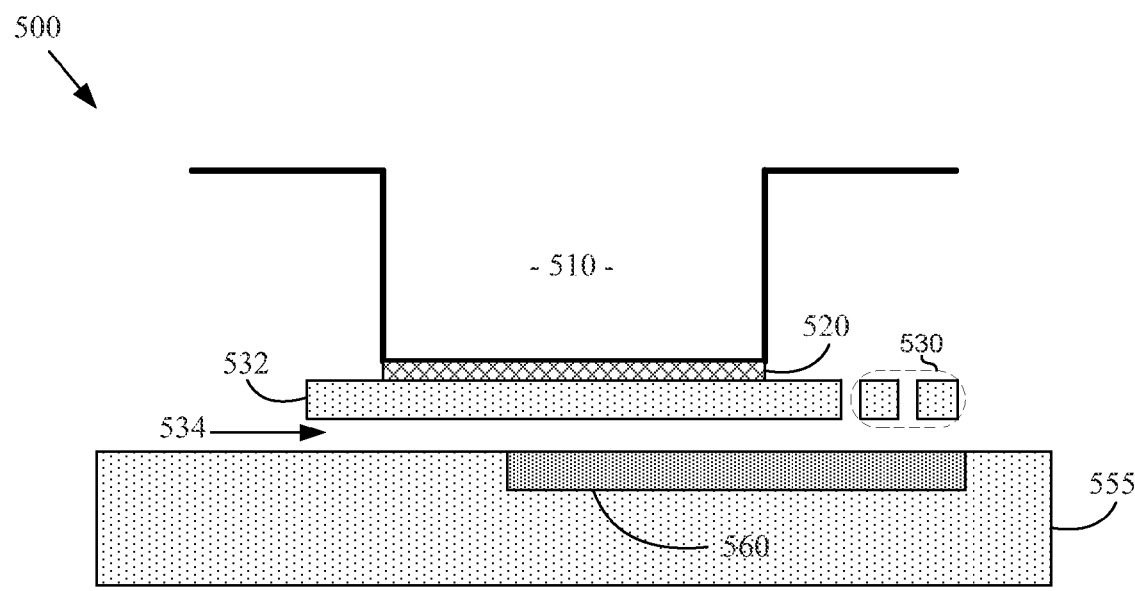
FIG. 5 shows an example MEMS sensor architecture comprising a piezoresistive strain gauge in a base substrate, in accordance with various aspects of the present disclosure.

As mentioned herein, a stress/strain gauge may be formed in or on a base substrate (e.g., an IC layer, for example a CMOS layer) below the MEMS actuator. An example of this is shown at FIG. 5. Such figure shows an example MEMS sensor architecture comprising, for instance, a piezoresistive stress/strain gauge in or on a base substrate, in accordance with various aspects of the present disclosure. The example sensor 500 may, for example, share any or all characteristics with other example sensors discussed herein.

The example sensor 500 comprises a stress/strain gauge 560 formed in the base substrate or layer 555 (e.g., an IC substrate or layer) generally and/or directly below the MEMS actuator 530 and anchor 532. While not shown in FIG. 5, there may generally be anchor points at various points between the MEMS layer and the base substrate 555. The sensor 500 may, for example, comprise an air gap 534 and/or more one or more dielectric layers between the MEMS actuator 530 and the base substrate 555.

Figure 6A:
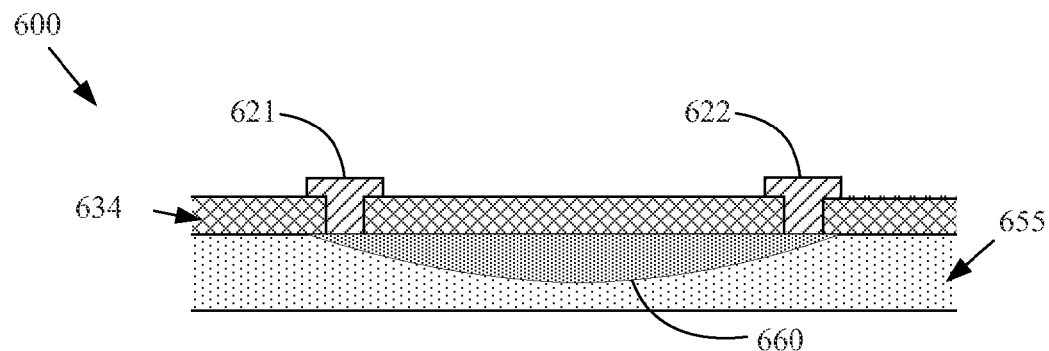
FIGS. 6A-6B show example piezoresistive strain gauges, in accordance with various aspects of the present disclosure.
Figure 6B:
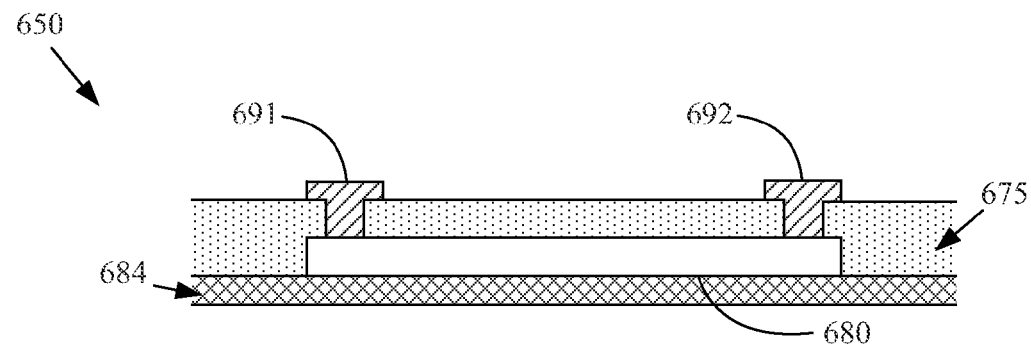

The stress/strain gauge 560 may be formed in any of a variety of manners. Non-limiting examples of the stress/strain gauge 560 are shown in FIGS. 6A and 6B. FIGS. 6A-6B show example stress/strain gauges (e.g., piezoresistive stress/strain gauges), in accordance with various aspects of the present disclosure. Such stress/strain gauges may share any or all characteristics with other stress/strain gauges discussed herein.

In FIG. 6A, for example, a base substrate or layer 655 (e.g., an IC layer) of the stress/strain gauge 600 may comprise a doped region 660 and contacts 621 and 622. The resistance and/or resistivity between the contacts 621 and 622 may change as the stress/strain on the base substrate 655 changes and may thus be monitored and used as an indication of stress/strain.

In FIG. 6B, for example, a base substrate or layer 675 (e.g., an IC layer) of the stress/strain gauge 650 may comprise a gate structure 680 (e.g., polysilicon) and contacts 691 and 692. The resistance and/or resistivity between the contacts 691 and 692 may change as the stress/strain on the polysilicon gate 680 changes and thus be monitored and used as an indication of stress/strain. A lower layer 684 (e.g., a semiconductor layer, dielectric layer, etc.) covers the polysilicon gate 680.

It should be noted that the example stress/strain gauge (or stress/strain measuring) structures or methods discussed herein are merely examples. The scope of various aspects of this disclosure should not be limited by characteristics of any particular structure or method.

As discussed here, the scope of this disclosure is not limited to any particular type of sensor (e.g., MEMS sensor). Non-limiting examples of sensors will now be presented for illustrative purposes.

Figure 7:
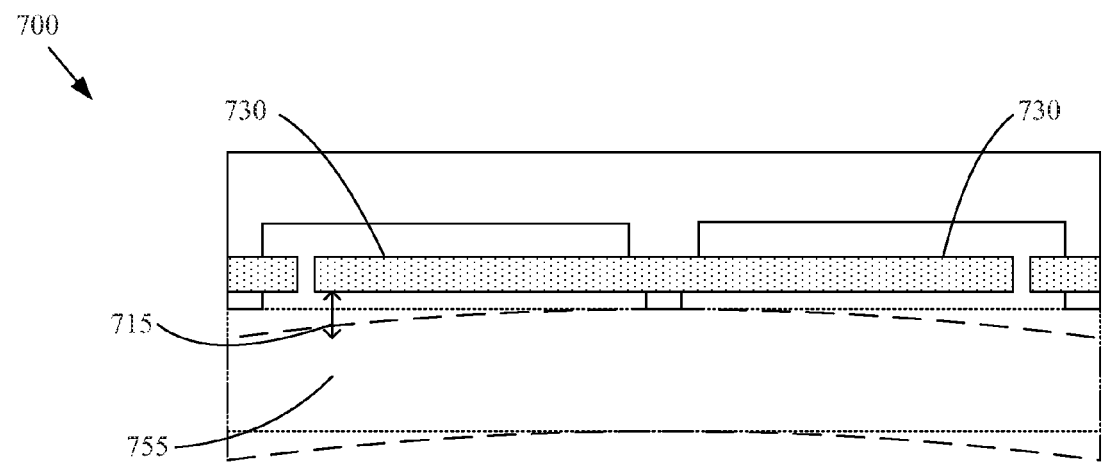
FIG. 7 shows an example MEMS accelerometer implementation, in accordance with various aspects of the present disclosure.

FIG. 7 shows an example MEMS accelerometer implementation, in accordance with various aspects of the present disclosure. The sensor 700 may, for example comprise a MEMS accelerometer actuator 730 and a base substrate or layer 755 (e.g., an IC layer). The base substrate 755 in an unstressed (or less stressed) state is shown by dotted lines and in a more stressed state is shown by dashed lines. The gap 715 between the actuator 730 and the base substrate 755 may, for example, change depending on the amount of stress. For example, as illustrated, the base substrate 755 may bend away from (or toward) the actuator 730. Since the gap 715 directly affects the capacitance that is measured to determine acceleration, a change in the gap that is due to stress and not to acceleration would change one or both of the offset and sensitivity, which should be compensated for, for example, in accordance with the structures and/or methods discussed herein.

Figure 8:
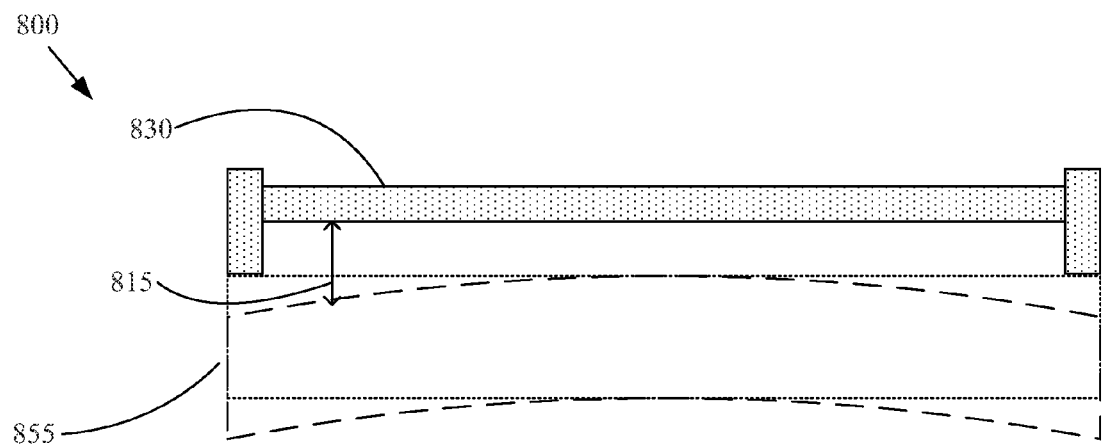
FIG. 8 shows an example MEMS pressure sensor implementation, in accordance with various aspects of the present disclosure.

FIG. 8 shows an example MEMS pressure sensor implementation, in accordance with various aspects of the present disclosure. The sensor 800 comprises, for example, a MEMS pressure sensor actuator (or diaphragm) 830 and a base substrate or layer 855 (e.g., an IC layer). The gap 815 between the actuator 830 and the base substrate 855 may, for example, change depending on stress/strain. For example, the base substrate 855 may bend away from, or toward, the actuator 830. In the example shown, the base substrate 855 in an unstressed (or less stressed) state is represented by dotted lines and the base substrate 855 in a stressed (or more stressed) state, resulting in the base substrate 855 being bent away from the actuator 830, is represented by dashed lines. Since the gap 815 between base substrate 855 and actuator 830 directly affects the capacitance that is measured to determine pressure, a change in the gap that is due to stress not caused by a change in pressure would change one or both of the offset and sensitivity, which may be compensated for, for example in accordance with the structures and methods discussed herein.

For utilizing determined stress/strain to compensate for stress/strain-induced components in sensor signals, a relationship between stress/strain and its effect on the sensor output signal (or performance) may be determined. Such a determination may, for example, be performed analytically and/or empirically. In a scenario that involves empirical determination, such a determination may be determined by lab experimentation, production testing, and/or in the field. An example of a method for determining a relationship between detected stress/strain and sensor output is provided at FIG. 9.

Figure 9:
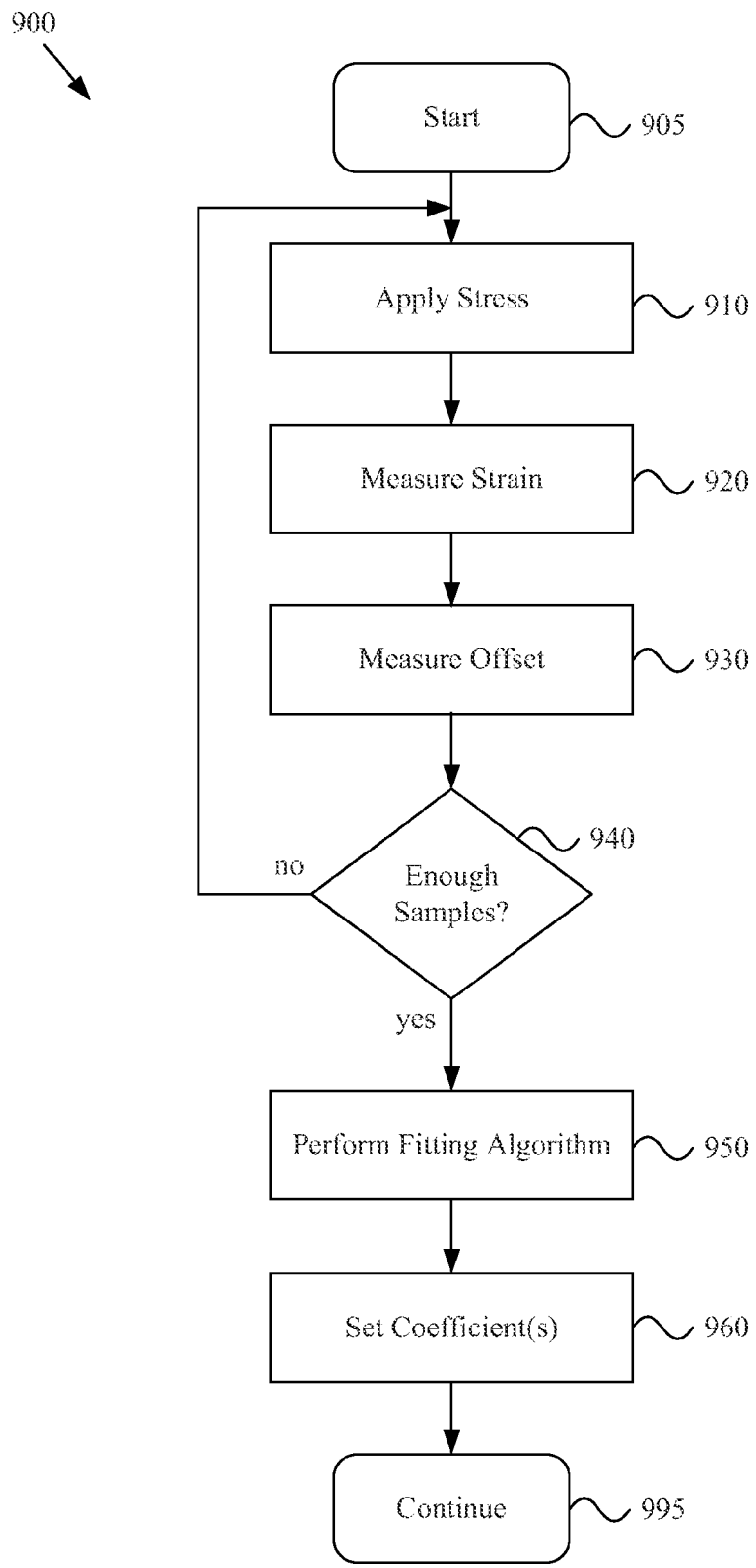
FIG. 9 shows a flow diagram of an example method for determining a strain-based compensation for a sensor, in accordance with various aspects of the present disclosure.

FIG. 9 shows a flow diagram of an example method 900 for determining a stress/strain-based calibration for a sensor, in accordance with various aspects of the present disclosure.

The example method 900 begins executing at block 905.

Figure 10:
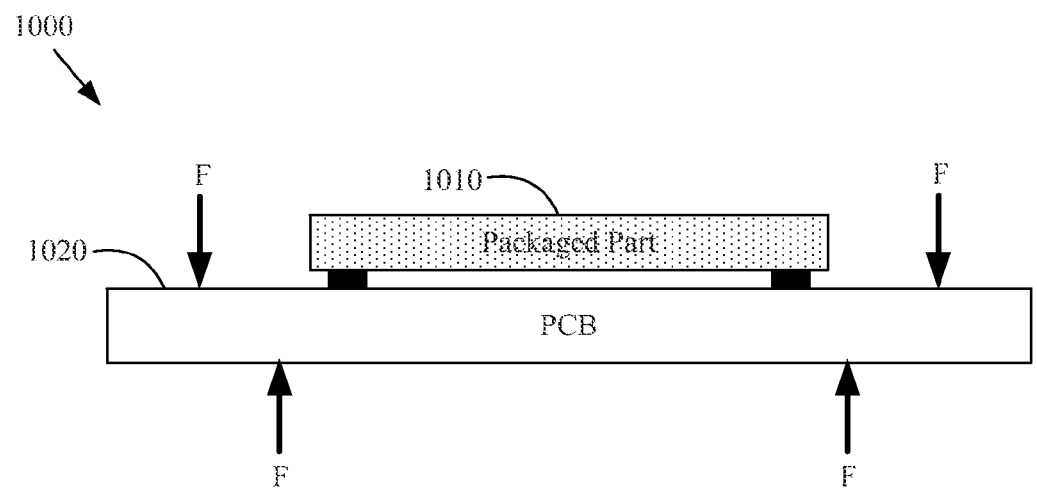
FIG. 10 shows an example sensor calibration test implementation, in accordance with various aspects of the present disclosure.

At block 910, a stress force is applied to the sensor. The stress force may be applied in any of a variety of manners. For example, block 910 may comprise utilizing a test fixture to apply the stress force (e.g., a bending force). As illustrated in FIG. 10, an electronic package 1010 housing one or more sensors and one or more strain gauges such as any one of the sensors and strain gauges described herein, may be mounted to a printed circuit board (PCB) 1020. A test fixture may then be utilized to apply stress forces (labeled "F") to the PCB 1020 and/or the packaged part 1010 (e.g., bending forces). Block 910 may, for example, comprise determining an amount of stress to apply. The application of the stress may, for example, comprise applying single amount of force, but in various scenarios a plurality of different amounts of force may be applied.

While a stress force is being applied to the sensor at block 910, the stress/strain on the sensor may be measured at block 920, for example utilizing any of the stress/strain measurement structures or methods discussed herein. Additionally, at block 930, while the stress is being applied to the sensor at block 910, the sensor output signal may be monitored and logged. Thus, in such a scenario, for a particular applied stress (e.g., particular type of stress, particular amount of stress, particular directionality of stress, etc.), a strain on the sensor may be measured and the output of the sensor may be monitored and logged (e.g., before, during, and/or after application of the stress).

At flow control block 940, a determination is made whether enough measurements have been taken. For example, steps 910-930 may be performed for a single stress (e.g., characterized by type of force, amount of force, directionality of force, and/or the like.) applied multiple times and/or for a plurality of different stresses being applied (e.g., following sequential steps of a test stress profile). For example, a sequence of N stress forces may be applied to the sensor under test, with the output of the sensor monitored and logged before, during, and/or after each of the N stress forces. A table or multi-dimensional array may be populated with the measured and/or monitored information.

Thus, at the completion of block 940, an array of strain measurements collected from the on-board stress/strain gauge, and a corresponding array of samples of the monitored output signal(s) of the MEMS sensor, may be stored in a memory. An array corresponding to the actual applied forces (e.g., as measured/indicated by the test fixture) may also be stored.

When enough samples have been taken, the flow control block 940 may direct execution of the method 900 to the "perform fitting algorithm" block 950.

At the perform fitting algorithm block 950, a fitting algorithm may be executed to determine a relationship between the monitored output signal(s) of the on-board strain gauge, and the monitored output signal(s) of the MEMS sensor. The relationship may, for example, be expressed as a constant offset (or set of offsets) to be added to or subtracted from the sensor output signal based on stress/strain indicated by the on-board stress/strain gauge. The relationship may, for example, be expressed as a factor by which a value of the stress/strain gauge signal is to be multiplied to determine an effect on the sensor output signal(s). The relationship may, for example, be expressed as a multi-coefficient function relating the stress/strain indicated by the on-board gauge and the output signal(s) of the sensor. The determined relationship may, for example, be linear or non-linear, depending on various factors (e.g., test results, required accuracy, computational complexity, energy expenditure, etc.). In an example implementation, the perform fitting algorithm block 950 may comprise performing a least-squares fit (e.g., using a plurality of measurements at a single measurement stress, using a plurality of measurements at each of a plurality of different applied stresses, etc.) to determine one or more coefficients that express the relationship between measured sensor stress/strain and sensor output signal. The stress/strain may result in gain and/or offset errors in the sensor output signal. In an example scenario, the fitting algorithm may generate a piecewise linear function in which straight-line segments are utilized to connect the points at which explicit testing was performed. In another example scenario, the fitting algorithm may utilize second-order or higher-order splining functions to connect the points at which explicit testing was performed. Such functions may then, for example as discussed below in the method 1200 of FIG. 12, be utilized to determine an offset, gain and/or other adjustment for error compensation as a function of a measured strain during operation.

After performing the fitting algorithm at block 950, execution of the method 900 may flow to the "set coefficient(s)" block 960. At block 960, the coefficients may be incorporated into the hardware and/or software that operate the sensor. As discussed herein, the method 900 may be performed a single time for one or more samples of a sensor product, and then the results can be utilized in all sensor products of the same type (e.g., stored in non-volatile memory of the sensor, stored in a sensor driver software routine, etc.). Also for example, the method 900 may be performed at production time for each sensor, for example when production circumstances allow for it. Additionally, for example, the method 900 may be performed in the field when various forces (e.g., gravitational forces, electromagnetic forces, thermal expansion forces, etc.) are applied to the sensor.

Figure 11:
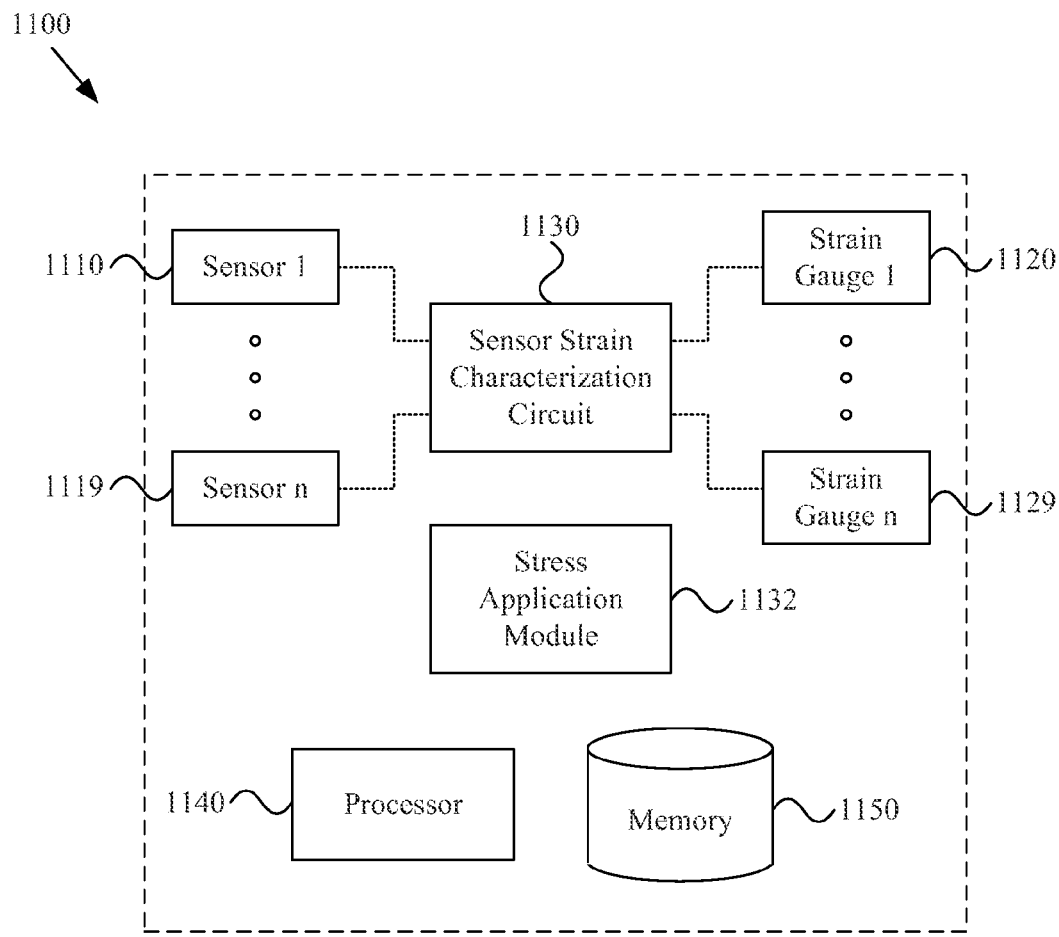
FIG. 11 shows a sensor calibration determination system, in accordance with various aspects of the present disclosure.

The example method 900 and the like may be performed by any of a variety of systems, an example of which is shown at FIG. 11. The system 1100 may, for example, comprise a plurality of sensors 1110-1119, having at least one stress/strain gauge 1120-1129. The stress application module 1132 (or circuit) may, for example, comprise servos, motors, solenoids, heaters, refrigerators, magnetic field generators, and/or the like for generating test stress forces and circuitry for controlling manage the application of such test stresses to the sensor under test (e.g., as discussed regarding block 910). The sensor stress/strain characterization circuit 1130 may, for example, monitor and log test results (e.g., as discussed regarding blocks 920-940). When the testing is complete, the sensor stress/strain characterization circuit 1130 may determine the relationship between the measured sensor stress/strain and the sensor output signal (e.g., as discussed regarding block 950) and set the coefficients of the sensor (e.g., as discussed regarding block 960). The sensor stress/strain characterization circuit 1130 and/or stress application circuit 1132 (or any portion thereof) may, for example, be implemented by the processor 1140 operating in accordance with software instructions stored in the memory 1150.

Once circuitry of the system has been programmed with the stress/strain-output relationship, for example as determined by executing the example method 900 or the like, the system may operate to compensate for stress/strain in real-time. An example of a method for operating the sensor to perform such calibration is provided at FIG. 12.

Figure 12:
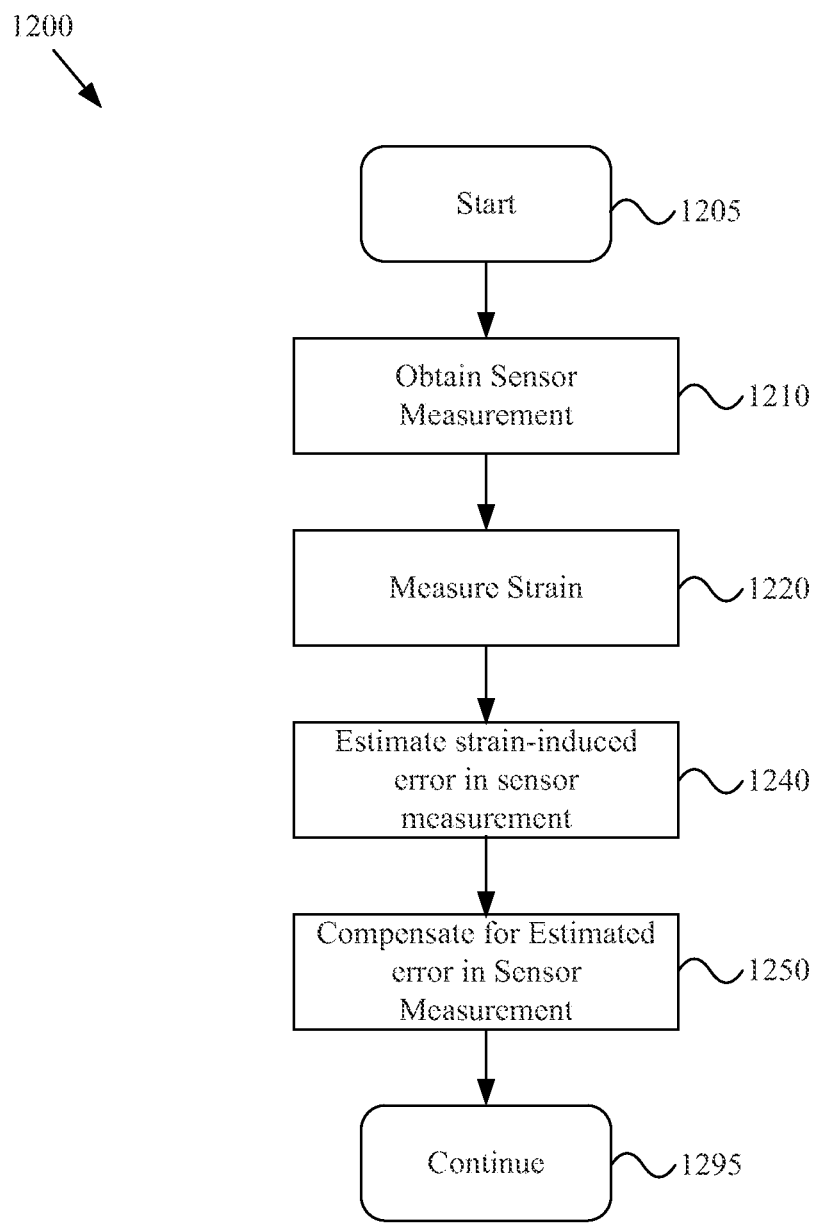
FIG. 12 shows a flow diagram of an example method for compensating a sensor signal, in accordance with various aspects of the present disclosure.

FIG. 12 shows a flow diagram of an example method 1200 for compensating a sensor signal, in accordance with various aspects of the present disclosure.

The example method 1200 begins executing at block 1205.

During operation of the sensor (e.g., as integrated into a consumer electronic device), the obtain sensor measurement block 1210 may comprise receiving an output signal from a sensor (e.g., an accelerometer, magnetometer, pressure sensor, audio sensor, gyroscope, etc.). At measure stress/strain block 1220, the stress/strain being experienced by the sensor may be measured. For example, block 1220 may comprise utilizing any of the stress/strain sensing structures and/or methods presented herein. Although shown sequentially, the sensor measurement and strain measurement may occur simultaneously.

At estimate offset block 1240, the impact of the measured stress/strain on the sensor output may be determined. For example, utilizing the stress/strain-to-sensor-output relationship determined by the example method 900, block 1240 may determine a strain-induced error in the sensor signal. The error may be represented as, for example, one or more gain and/or offset values. For example, each of the offset values may be a value to be added or subtracted from the sensor output when a corresponding amount of stress/strain is present. Similarly, each of the gain values may be a value by which the sensor output is to be multiplied when a when a corresponding amount of stress/strain is present.

At compensate for estimated error in sensor measurement block 1250, the sensor measurement obtained at block 1210 may be adjusted to compensate for the strain-induced error. This may comprise, for example, subtracting off an offset (e.g., an angle offset resulting from misalignment) and/or applying a gain (which may be less than or greater than 1) that is the inverse of an estimated gain error, or the like. The sensor device and/or mother device into which the sensor device is incorporated may then utilize the stress/strain-compensated sensor signal.

Figure 13:
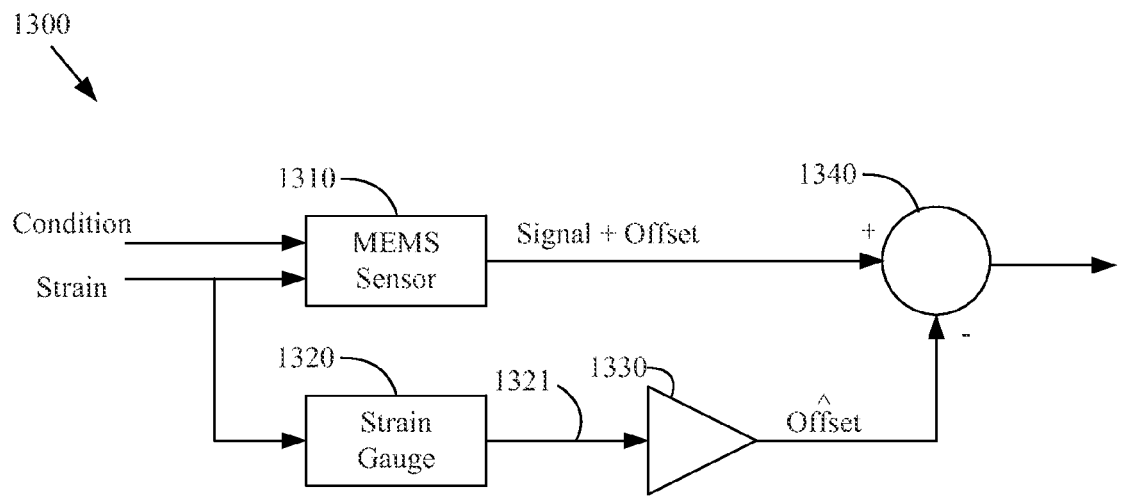
FIG. 13 shows an example, strain-based sensor compensation circuit, in accordance with various aspects of the present disclosure.

FIG. 13 shows an example stress/strain-based sensor compensation circuit, in accordance with various aspects of the present disclosure. The circuit 1300 may, for example, perform any or all of the functional aspects discussed herein (e.g., with respect to the example method 1200 illustrated in FIG. 12). For example, the MEMS sensor 1310 may output a signal that comprises a first component (e.g., labeled "Signal") due to the condition (or stimulus) being sensed (e.g., acceleration, pressure, orientation, etc.) and a second component (e.g., labeled "Offset") that is due to stress being applied to the sensor. The stress/strain gauge 1320 may, for example, measure the stress/strain being experienced by the sensor and generate an output indicative of the measured stress/strain. The gain block 1330, for example comprising an analog and/or digital amplifier may then convert the measured stress/strain (e.g., multiplying by a stress/strain-to-sensor-output coefficient) to estimate the Offset to be removed from the output of the MEMS sensor 1310. The subtracting block 1340 may then remove the estimated offset from the sensor signal to restore the sensor signal to being representative of the condition (or stimulus) being sensed (e.g., to remove error in the signal due to stress/strain).

Figure 14:
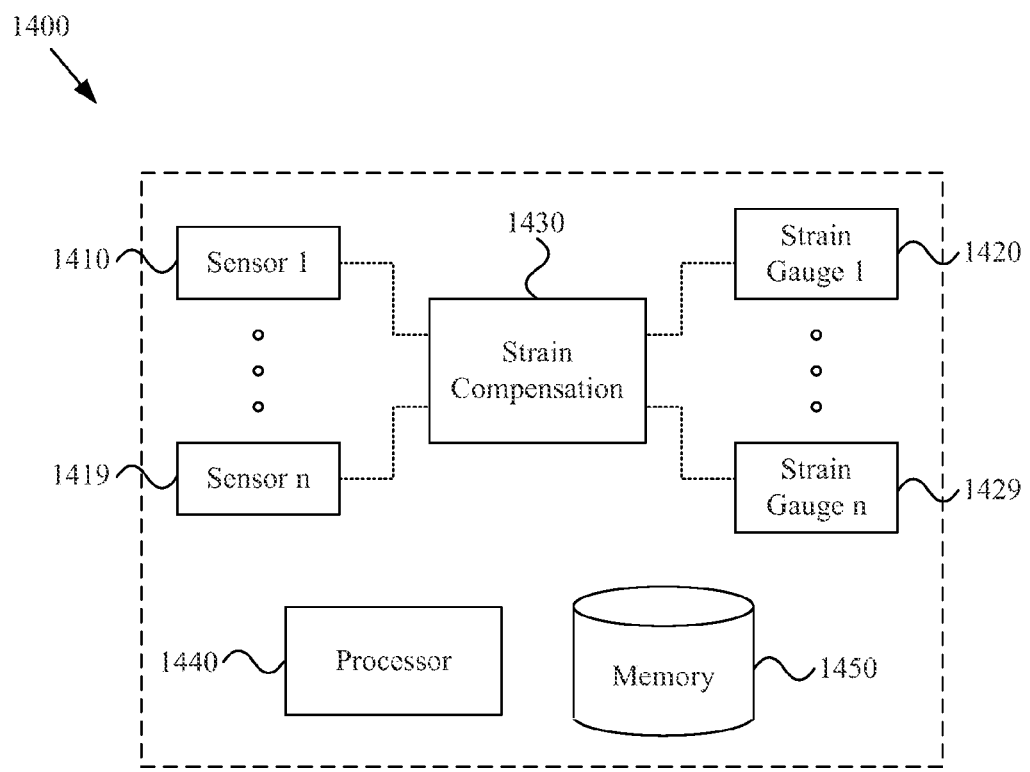
FIG. 14 shows a strain-based sensor compensation system, in accordance with various aspects of the present disclosure.

FIG. 14 shows a sensor compensation system 1400, in accordance with various aspects of the present disclosure. The sensor compensation system 1400 may, for example, share any or all characteristics with the circuit 1300 illustrated in FIG. 13. For example, the first sensor 1410 or any sensor may share any or all characteristics with the MEMS sensor 1310, the first strain gauge 1420 or any may share any or all characteristics with the strain gauge 1320, and the strain compensation circuit 1430 may share any or all characteristics with the gain block 1330 and subtracting block 1340. The sensor compensation system 1400 may, for example, operate to perform any or all aspects of the method 1200 shown in FIG. 12.

The system 1400 may, for example, comprise a plurality of sensors 1410-1419, any of which having at least one stress/strain gauge 1420-1429. The stress/strain compensation circuit 1430 may, for example, perform any or all aspects of the example method 1200 illustrated in FIG. 12 (e.g., obtaining sensor measurements, measuring stress/strain, estimating a stress/strain-based sensor offset, and/or removing the estimated stress/strain-based offset from the sensor measurement.)

The stress/strain compensation circuit 1430 (or any portion thereof) may, for example, be implemented by the processor 1440 operating in accordance with software instructions stored in the memory 1450. For example, the stress/strain-to-sensor-output relationship (e.g., one or more coefficients representing such relationship) may also be stored in the memory 1450 (e.g., a non-volatile memory).

An example system in accordance with an implementation of this disclosure will now be described. The example system comprises a microelectromechanical system (MEMS) sensor (e.g. 1410), a strain gauge (e.g., 1420), and a strain compensation circuit (e.g., 1430). The MEMS sensor is operable to generate a sensor output signal that corresponds to a sensed condition or stimulus (e.g., acceleration, orientation, angular rate, and/or pressure). The strain gauge is operable to generate a strain measurement signal indicative of a strain on the MEMS sensor. The strain compensation circuit is operable to compensate the sensor output signal based on the strain measurement signal. The strain compensation circuit stores sensor-strain relationship data indicative of a relationship between the sensor output signal and the strain measurement signal. The strain compensation circuit is operable to use the sensor-strain relationship data for the compensation of the sensor output signal. The compensation of the sensor output signal comprises one or both of: removal of an offset from the sensor signal, and application of a gain to the sensor signal, as well as other possible corrections (e.g., linear and/or nonlinear corrections). The strain gauge may be a piezoresistive strain gauge (e.g., 600) or a strain-sensitive MEMS resonator (e.g., 400) comprising a resonating member, an excitation plate, and a sustaining amplifier. The resonating member (e.g., 452) may be a beam or diaphragm. The strain gauge resides in an integrated circuit die (IC die) to which the MEMS sensor is mounted. The strain gauge and MEMS sensor are mechanically coupled via one or more anchor points.

An example method in accordance with an implementation of this disclosure will now be described. A microelectromechanical system (MEMS) sensor (e.g., 1410) generates a measurement signal (e.g., 1310) that corresponds to a sensed condition or stimulus (e.g., acceleration, orientation, and/or pressure). A strain gauge generates a strain measurement signal (e.g., 1321) indicative of a strain on the MEMS sensor. A strain compensation circuit modifies the sensor output signal to compensate for the strain based on the strain measurement signal. The strain compensation circuit stores sensor-strain relationship data indicative of the relationship between the sensor output signal and the strain measurement signal, and performs the compensating based on the sensor-strain relationship data. The compensating comprises one or both of: removing an offset from the sensor signal, and applying a gain to the sensor signal.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

The invention claimed is:

1. A system comprising:
   a microelectromechanical system (MEMS) sensor operable to generate a sensor output signal that corresponds to a sensed condition;
   a strain gauge operable to generate a strain measurement signal indicative of a strain on the MEMS sensor, wherein the strain gauge and MEMS sensor are mechanically coupled via one or more anchor points; and
   a strain compensation circuit, wherein the strain compensation circuit is operable to modify the sensor output signal to compensate for the strain based on the strain measurement signal.

2. The system of claim 1, wherein:
   the strain compensation circuit stores sensor-strain relationship data indicative of a relationship between the sensor output signal and the strain measurement signal; and
   the strain compensation circuit is operable to use the sensor-strain relationship data for the modification of the sensor output signal.

3. The system of claim 2, wherein the strain compensation stores the sensor-strain relationship data in a non-volatile memory.

4. The system of claim 1, wherein the modification of the sensor output signal comprises one or both of: removal of an offset from the sensor signal, and application of a gain to the sensor signal.

5. The system of claim 1, wherein the modification of the sensor output signal is based, at least in part, on a piecewise linear relationship between strain and an offset and/or between strain and a gain.

6. The system of claim 1, wherein the strain gauge is a piezoresistive strain gauge.

7. The system of claim 1, wherein the strain gauge is a strain-sensitive MEMS resonator comprising a resonating member, an excitation plate, and a sustaining amplifier.

8. The system of claim 7, wherein the resonating member is a beam or diaphragm.

9. The system of claim 1, wherein the MEMS sensor comprises a base substrate coupled to a handle substrate.

10. The system of claim 9, wherein the base substrate is bonded to the handle substrate.

11. The system of claim 10, wherein the base substrate is bonded to the handle substrate utilizing a eutectic bond.

12. The system of claim 10, wherein the base substrate is bonded to the handle substrate in a manner that provides an electrical connection between an actuator of the MEMS sensor and the base substrate.

13. The system of claim 9, wherein the base substrate comprises electrical circuits.

14. The system of claim 9, wherein the base substrate comprises non-volatile memory.

15. The system of claim 9, wherein the strain gauge is formed in the base substrate.

16. The system of claim 1, wherein the MEMS sensor and the strain gauge are formed on a same substrate.

17. The system of claim 1, wherein the condition is one or more of: acceleration, orientation, angular rate, and pressure.

18. A method comprising:
generating, by a microelectromechanical system (MEMS) sensor, a sensor output signal that corresponds to a sensed condition;
generating, by a strain gauge, a strain measurement signal indicative of a strain on the MEMS sensor, wherein the strain gauge and MEMS sensor are mechanically coupled via one or more anchor points; and
modifying, by a strain compensation circuit, the sensor output signal to compensate for the strain based on the strain measurement signal.

19. The method of claim 18, comprising:
storing, by the strain compensation circuit, sensor-strain relationship data indicative of a relationship between the sensor output signal and the strain measurement signal; and
performing the modifying based on the sensor-strain relationship data.

20. The method of claim 18, wherein the modifying the sensor output signal comprises one or both of: removing an offset from the sensor signal, and applying a gain to the sensor signal.

21. The system of claim 18, wherein the modification of the sensor output signal is based, at least in part, on a piecewise linear relationship between strain and an offset and/or between strain and a gain.

22. The method of claim 18, wherein the strain gauge is a piezoresistive strain gauge.

23. The method of claim 18, wherein the strain gauge is a strain-sensitive MEMS resonator comprising a resonating member, an excitation plate, and a sustaining amplifier.

24. The method of claim 23, wherein the resonating member is a beam or diaphragm.

25. The method of claim 18, wherein the strain gauge resides in an integrated circuit die to which the MEMS sensor is mounted.

26. The method of claim 18, wherein the condition is one or more of:
acceleration, orientation, angular rate, and pressure.

27. A method comprising:
applying a mechanical stress to a MEMS sensor; and
while applying the mechanical stress to the MEMS sensor:
monitoring, by a strain characterization circuit, an output signal of a strain gauge coupled to the MEMS sensor, wherein the strain gauge and MEMS sensor are mechanically coupled via one or more anchor points;
monitoring, by the strain characterization circuit, an output signal of the MEMS sensor;
determining, by the strain characterization circuit, a relationship between the output signal of the strain gauge and the output signal of the MEMS sensor; and
storing, in a strain compensation circuit, data indicative of the relationship between the output signal of the strain gauge and the output signal of the MEMS sensor.

28. The method of claim 27, comprising:
performing by said strain compensation circuit:
modifying the output signal of the MEMS sensor to compensate for strain based on the stored data indicative of the relationship between the output signal of the strain gauge and the output signal of the MEMS sensor.

* * * * *